US012666495B2

(12) United States Patent      (10) Patent No.: US 12,666,495 B2

Harris      (45) Date of Patent: Jun. 23, 2026

(54) DYNAMIC DISCONTINUOUS RECEPTION CONTROL WITH PROXIMITY-BASED TIMER ADJUSTMENT

(71) Applicant: Nokia Technologies Oy, Espoo (FI)

(72) Inventor: John Harris, Whitefish Bay, WI (US)

(73) Assignee: Nokia Technologies Oy, Espoo (FI)

( * ) Notice: Subject to any disclaimer, the term of this patent is extended or adjusted under 35 U.S.C. 154(b) by 313 days.

(21) Appl. No.: 18/634,036

(22) Filed: Apr. 12, 2024

(65) Prior Publication Data

US 2025/0324482 A1     Oct. 16, 2025

(51) Int. Cl.
| | | |
|---|---|---|
| *H04W 76/28* | (2018.01) | |
| *H04L 1/08* | (2006.01) | |
| *H04W 72/12* | (2023.01) | |
| *H04W 72/1268* | (2023.01) | |
| *H04W 72/1273* | (2023.01) | |

(52) U.S. Cl.
CPC .............. *H04W 76/28* (2018.02); *H04L 1/08* (2013.01); *H04W 72/1268* (2013.01); *H04W 72/1273* (2013.01)

(58) Field of Classification Search
CPC ............. H04W 76/28; H04W 72/1268; H04W 72/1273; H04L 1/08
See application file for complete search history.

(56) References Cited

U.S. PATENT DOCUMENTS

2010/0037114 A1    2/2010   Huang et al.
2024/0107409 A1*   3/2024   Da Silva ........... H04W 36/0033

FOREIGN PATENT DOCUMENTS

| EP | 2314010 A2 | 4/2011 |
|---|---|---|
| EP | 2314010 B1 | 7/2012 |
| EP | 3528586 A1 | 8/2019 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.6.0, Sep. 2023, pp. 1-1337.
"3rd Generation Partnership Project; Technical Specification Group Radio Access Network; NR; Medium Access Control (MAC) protocol specification (Release 17)", 3GPP TS 38.321, V17.6.0, Sep. 2023, pp. 1-253.

(Continued)

*Primary Examiner* — Ronald B Abelson
(74) *Attorney, Agent, or Firm* — Nokia Technologies Oy

(57) ABSTRACT

A method is provided that includes receiving a configuration of parameters for discontinuous reception (DRX) operation in which a user equipment monitors a downlink channel. The parameters include at least one timer that specifies a duration in which the user equipment is to be in an active state to monitor the downlink channel. The method includes detecting particular channel activity. The particular channel activity marks a beginning of a window during which the at least one timer is to run for the duration specified by the at least one timer. The method includes determining a proximity of the window to a next active time of the discontinuous active times. The method includes reducing the duration of the at least one timer, and thereby the window during which the at least one timer is to run, based on the proximity of the window to the next active time.

22 Claims, 10 Drawing Sheets

(56)           References Cited

OTHER PUBLICATIONS

"IEEE 802", Wikipedia, Retrieved on May 29, 2024, Webpage available at : https://en.wikipedia.org/wiki/IEEE_802.

"IEEE 802.11", Wikipedia, Retrieved on May 29, 2024, Webpage available at : https://en.wikipedia.org/wiki/IEEE_802.11.

"IEEE 802.15", Wikipedia, Retrieved on May 29, 2024, Webpage available at : https://en.wikipedia.org/wiki/IEEE_802.15.

"3rd Generation Partnership Project; Technical Specification Group Radio Access Network; NR; Physical layer procedures for data (Release 18)", 3GPP TS 38.214, V18.3.0, Jun. 2024, pp. 1-299.

"3rd Generation Partnership Project; Technical Specification Group Radio Access Network; NR; Medium Access Control (MAC) protocol specification (Release 18)", 3GPP TS 38.321, V18.2.0, Jun. 2024, pp. 1-332.

"3rd Generation Partnership Project; Technical Specification Group Radio Access Network; NR; Radio Resource Control (RRC) protocol specification (Release 18)", 3GPP TS 38.331, V18.2.0, Jun. 2024, pp. 1-1686.

"Clarification on PDCCH-based HARQ feedback", 3GPP TSG-RAN WG2 Meeting #119-e, R2-2207349, Qualcomm Inc., Aug. 17-29, 2022, 7 pages.

* cited by examiner

200

300 onDuration Timer 304

Opportunity for DRX

Long DRX cycle 302

Long DRX cycle 302 time

400 onDuration Timer 304

DL TRANSMISSION

Inactivity Timer 404

Long DRX cycle 302

Long DRX cycle 302 time

900

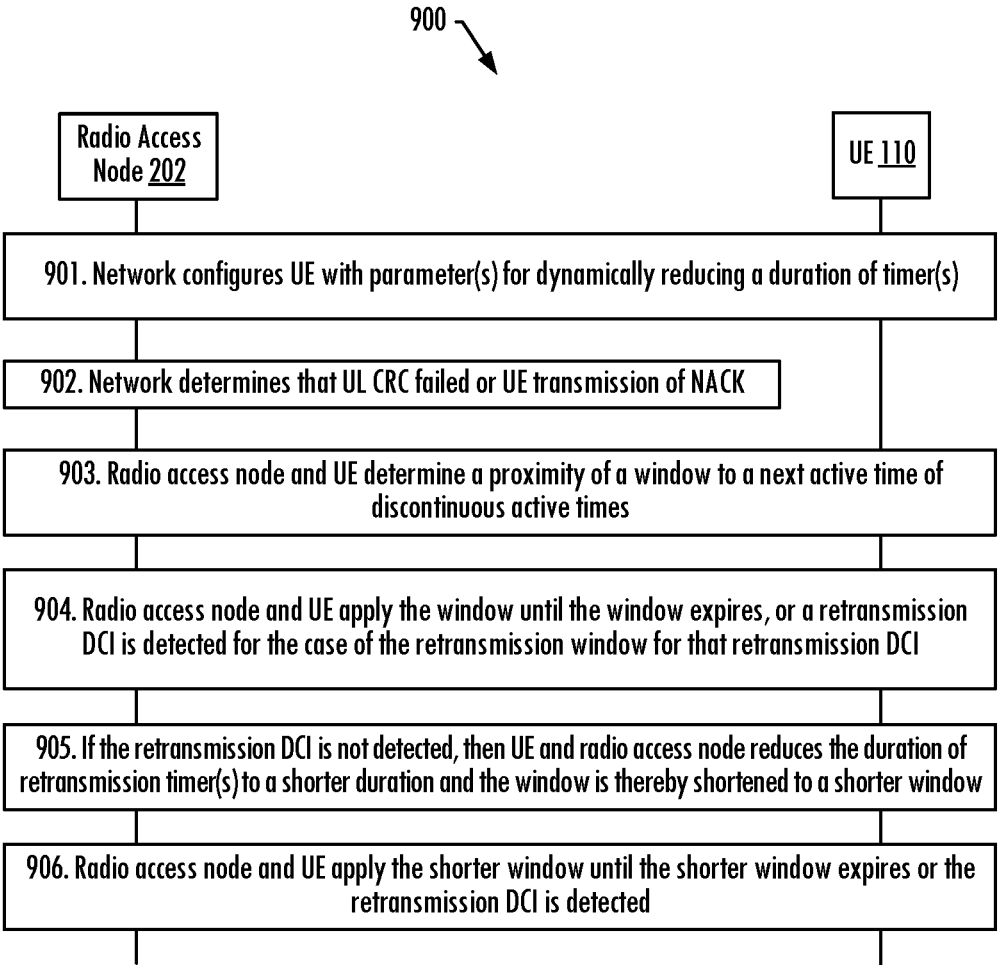

Radio Access
Node 202

UE 110

901. Network configures UE with parameter(s) for dynamically reducing a duration of timer(s)

902. Network determines that UL CRC failed or UE transmission of NACK

903. Radio access node and UE determine a proximity of a window to a next active time of discontinuous active times 904. Radio access node and UE apply the window until the window expires, or a retransmission DCI is detected for the case of the retransmission window for that retransmission DCI 905. If the retransmission DCI is not detected, then UE and radio access node reduces the duration of retransmission timer(s) to a shorter duration and the window is thereby shortened to a shorter window 906. Radio access node and UE apply the shorter window until the shorter window expires or the retransmission DCI is detected

FIG. 9

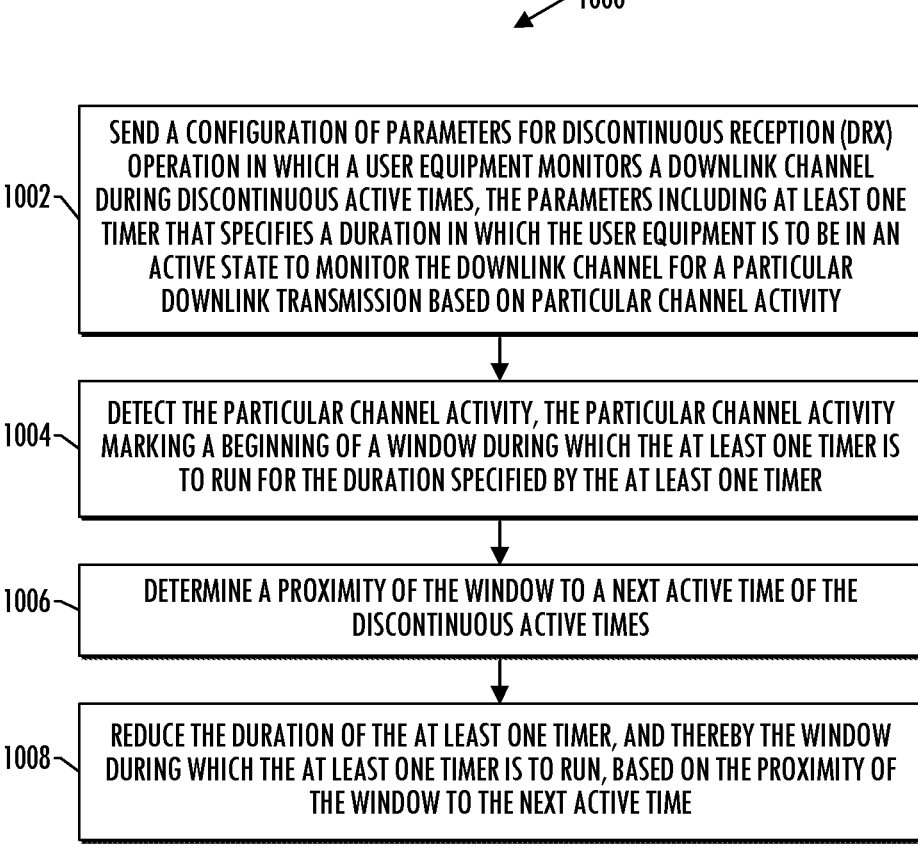

1000

1002 — SEND A CONFIGURATION OF PARAMETERS FOR DISCONTINUOUS RECEPTION (DRX) OPERATION IN WHICH A USER EQUIPMENT MONITORS A DOWNLINK CHANNEL DURING DISCONTINUOUS ACTIVE TIMES, THE PARAMETERS INCLUDING AT LEAST ONE TIMER THAT SPECIFIES A DURATION IN WHICH THE USER EQUIPMENT IS TO BE IN AN ACTIVE STATE TO MONITOR THE DOWNLINK CHANNEL FOR A PARTICULAR DOWNLINK TRANSMISSION BASED ON PARTICULAR CHANNEL ACTIVITY

1004 — DETECT THE PARTICULAR CHANNEL ACTIVITY, THE PARTICULAR CHANNEL ACTIVITY MARKING A BEGINNING OF A WINDOW DURING WHICH THE AT LEAST ONE TIMER IS TO RUN FOR THE DURATION SPECIFIED BY THE AT LEAST ONE TIMER

1006 — DETERMINE A PROXIMITY OF THE WINDOW TO A NEXT ACTIVE TIME OF THE DISCONTINUOUS ACTIVE TIMES

1008 — REDUCE THE DURATION OF THE AT LEAST ONE TIMER, AND THEREBY THE WINDOW DURING WHICH THE AT LEAST ONE TIMER IS TO RUN, BASED ON THE PROXIMITY OF THE WINDOW TO THE NEXT ACTIVE TIME

FIG. 10

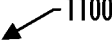

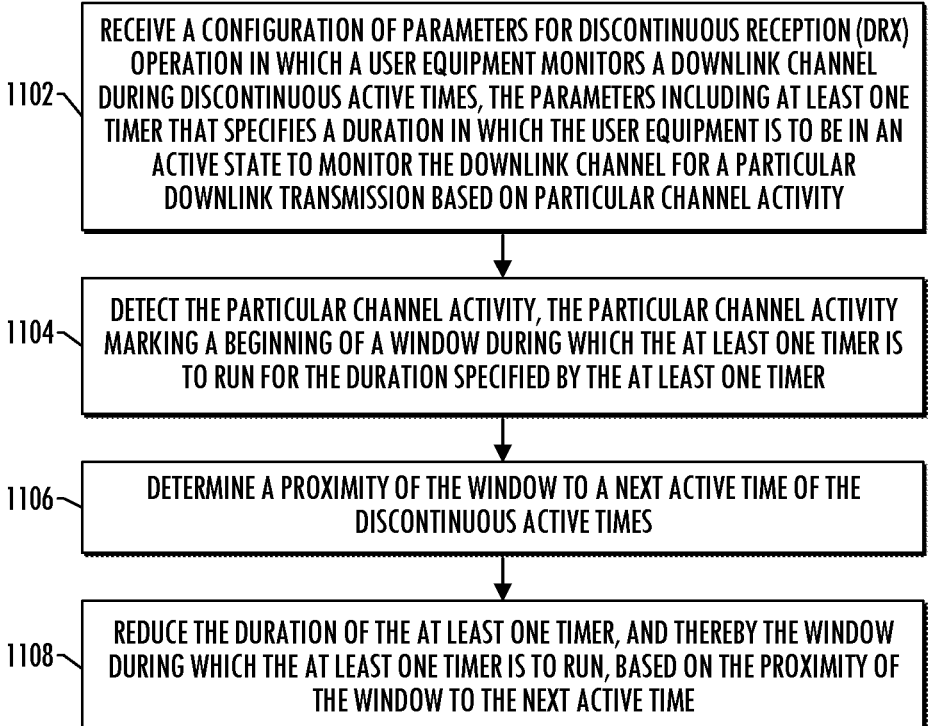

1102 — RECEIVE A CONFIGURATION OF PARAMETERS FOR DISCONTINUOUS RECEPTION (DRX) OPERATION IN WHICH A USER EQUIPMENT MONITORS A DOWNLINK CHANNEL DURING DISCONTINUOUS ACTIVE TIMES, THE PARAMETERS INCLUDING AT LEAST ONE TIMER THAT SPECIFIES A DURATION IN WHICH THE USER EQUIPMENT IS TO BE IN AN ACTIVE STATE TO MONITOR THE DOWNLINK CHANNEL FOR A PARTICULAR DOWNLINK TRANSMISSION BASED ON PARTICULAR CHANNEL ACTIVITY

1104 — DETECT THE PARTICULAR CHANNEL ACTIVITY, THE PARTICULAR CHANNEL ACTIVITY MARKING A BEGINNING OF A WINDOW DURING WHICH THE AT LEAST ONE TIMER IS TO RUN FOR THE DURATION SPECIFIED BY THE AT LEAST ONE TIMER

1106 — DETERMINE A PROXIMITY OF THE WINDOW TO A NEXT ACTIVE TIME OF THE DISCONTINUOUS ACTIVE TIMES

1108 — REDUCE THE DURATION OF THE AT LEAST ONE TIMER, AND THEREBY THE WINDOW DURING WHICH THE AT LEAST ONE TIMER IS TO RUN, BASED ON THE PROXIMITY OF THE WINDOW TO THE NEXT ACTIVE TIME

FIG. 11A

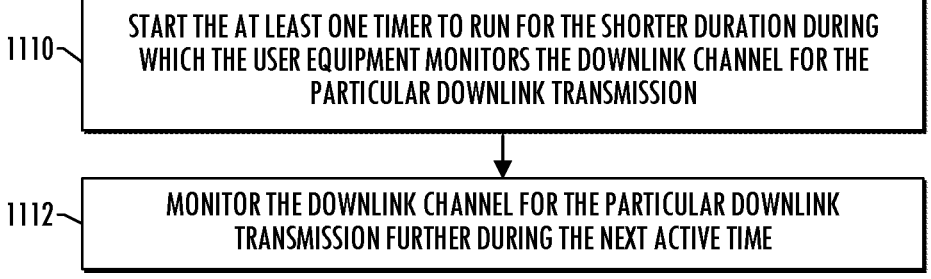

1110 — START THE AT LEAST ONE TIMER TO RUN FOR THE SHORTER DURATION DURING WHICH THE USER EQUIPMENT MONITORS THE DOWNLINK CHANNEL FOR THE PARTICULAR DOWNLINK TRANSMISSION

1112 — MONITOR THE DOWNLINK CHANNEL FOR THE PARTICULAR DOWNLINK TRANSMISSION FURTHER DURING THE NEXT ACTIVE TIME

FIG. 11B

1114 — MONITOR THE DOWNLINK CHANNEL FOR THE PARTICULAR DOWNLINK TRANSMISSION ONLY DURING THE NEXT ACTIVE TIME

FIG. 11C

DYNAMIC DISCONTINUOUS RECEPTION CONTROL WITH PROXIMITY-BASED TIMER ADJUSTMENT

TECHNOLOGICAL FIELD

The present disclosure relates generally to telecommunications and, in particular, discontinuous reception operation.

BACKGROUND

A telecommunications system can be seen as a facility that enables communication sessions between two or more entities such as user terminals, base stations and/or other nodes by providing carriers between the various entities involved in the communications path. A telecommunications system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless telecommunications system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the telecommunications system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The telecommunications system and associated devices typically operate in accordance with a given standard or specification which sets out what the various entities associated with the system are permitted to do and how that should be achieved. Communication protocols and/or parameters which shall be used for the connection are also typically defined. One example of a telecommunications system is the Universal Mobile Telecommunications System (UMTS). Other examples of telecommunications systems are Long-Term Evolution (LTE), LTE Advanced and the so-called 5G or New Radio (NR) networks. NR is being standardized by the 3rd Generation Partnership Project (3GPP).

BRIEF SUMMARY

Example implementations of the present disclosure are directed to telecommunications and, in particular, to discontinuous reception operation. Even more particularly, example implementations relate to dynamic control the discontinuous reception with proximity-based timer adjustment. The present disclosure thus includes, without limitation, the following example implementations.

Some example implementations provide an apparatus comprising: at least one memory configured to store instructions; and at least one processing circuitry configured to access the at least one memory, and execute the instructions to cause the apparatus to at least: send a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity; detect the particular channel activity, the particular channel activity marking a beginning of a window during which the at least one timer is to run for the duration specified by the at least one timer; determine a proximity of the window to a next active time of the discontinuous active times; and reduce the duration of the at least one timer, and thereby the window during which the at least one timer is to run, based on the proximity of the window to the next active time.

Some example implementations provide an apparatus comprising: means for sending a configuration of parameters for discontinuous reception (DRX) operation in which an user equipment monitors a downlink channel during discontinuous active times, the parameters including at least one timer that specifies a duration in which the user equipment is to be in an active state to monitor the downlink channel for a particular downlink transmission based on particular channel activity; means for detecting the particular channel activity, the particular channel activity marking a beginning of a window during which the at least one timer is to run for the duration specified by the at least one timer; means for determining a proximity of the window to a next active time of the discontinuous active times; and means for reducing the duration of the at least one timer, and thereby the window during which the at least one timer is to run, based on the proximity of the window to the next active time.

Some example implementations provide a method comprising: sending a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity; detecting the particular channel activity, the particular channel activity marking a beginning of a window during which the at least one timer is to run for the duration specified by the at least one timer; determining a proximity of the window to a next active time of the discontinuous active times; and reducing the duration of the at least one timer, and thereby the window during which the at least one timer is to run, based on the proximity of the window to the next active time.

Some example implementations provide a computer-readable storage medium that is non-transitory and has instructions stored therein that, in response to execution by at least one processing circuitry, causes an apparatus to at least: send a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity;

detect the particular channel activity, the particular channel activity marking a beginning of a window during which the at least one timer is to run for the duration specified by the at least one timer; determine a proximity of the window to a next active time of the discontinuous active times; and reduce the duration of the at least one timer, and thereby the window during which the at least one timer is to run, based on the proximity of the window to the next active time.

Some example implementations provide an apparatus comprising: at least one memory configured to store instructions; and at least one processing circuitry configured to access the at least one memory, and execute the instructions to cause the apparatus to at least: receive a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity; detect the particular channel activity, the particular channel activity marking a beginning of a window during which the at least one timer is to run for the duration specified by the at least one timer; determine a proximity of the window to a next active time of the discontinuous active times; and reduce the duration of the at least one timer, and thereby the window during which the at least one timer is to run, based on the proximity of the window to the next active time.

Some example implementations provide an apparatus comprising: means for receiving a configuration of parameters for discontinuous reception (DRX) operation in which an user equipment monitors a downlink channel during discontinuous active times, the parameters including at least one timer that specifies a duration in which the user equipment is to be in an active state to monitor the downlink channel for a particular downlink transmission based on particular channel activity; means for detecting the particular channel activity, the particular channel activity marking a beginning of a window during which the at least one timer is to run for the duration specified by the at least one timer; means for determining a proximity of the window to a next active time of the discontinuous active times; and means for reducing the duration of the at least one timer, and thereby the window during which the at least one timer is to run, based on the proximity of the window to the next active time.

Some example implementations provide a method comprising: receiving a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity; detecting the particular channel activity, the particular channel activity marking a beginning of a window during which the at least one timer is to run for the duration specified by the at least one timer; determining a proximity of the window to a next active time of the discontinuous active times; and reducing the duration of the at least one timer, and thereby the window during which the at least one timer is to run, based on the proximity of the window to the next active time.

Some example implementations provide a computer-readable storage medium that is non-transitory and has instructions stored therein that, in response to execution by at least one processing circuitry, causes an apparatus to at least:

receive a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity; detect the particular channel activity, the particular channel activity marking a beginning of a window during which the at least one timer is to run for the duration specified by the at least one timer; determine a proximity of the window to a next active time of the discontinuous active times; and reduce the duration of the at least one timer, and thereby the window during which the at least one timer is to run, based on the proximity of the window to the next active time.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIG. 9 is a signaling chart according to some example implementations;

FIG. 10 is a flowchart illustrating various steps in methods, according to some example implementations;

Figure 12:
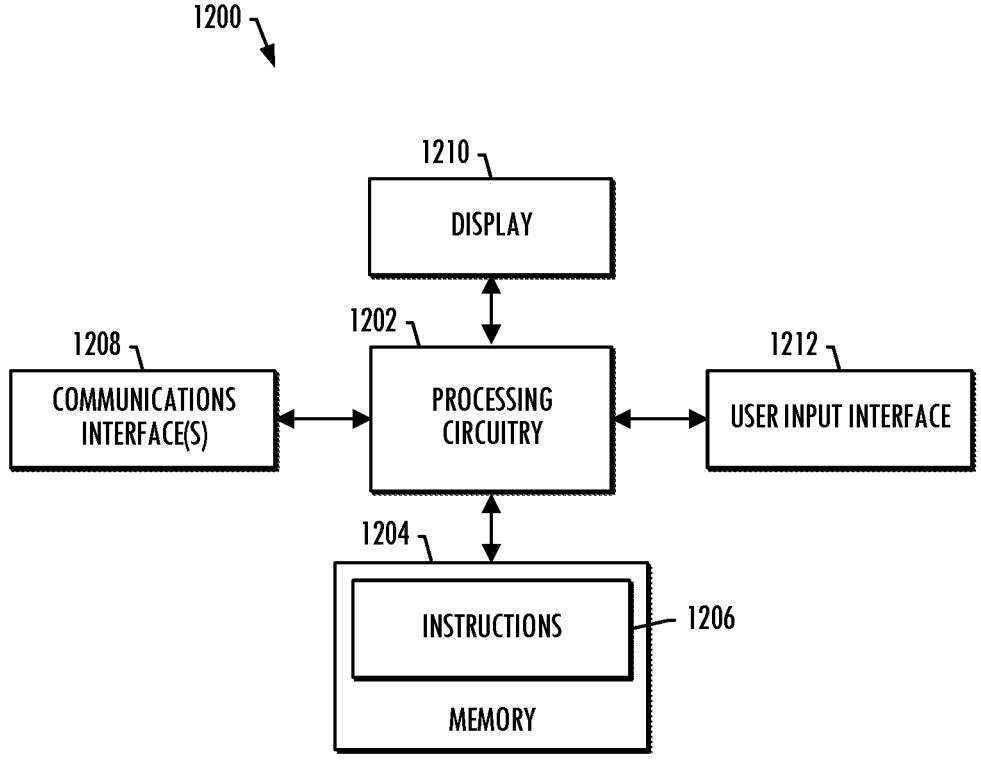

FIGS. 11A, 11B, and 11C are flowcharts illustrating various steps in methods, according to some example implementations; and FIG. 12 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably. The term "network" may refer to a group of interconnected computers including clients and servers; and within a network, these computers may be interconnected directly or indirectly by various means including via one or more switches, routers, gateways, access points or the like.

Reference may be made herein to terms specific to a particular system, architecture or the like, but it should be understood that example implementations of the present disclosure may be equally applicable to any of a number of systems, architectures and the like. For example, reference may be made to 3GPP technologies such as Global System for Mobile Communications (GSM), UMTS, LTE, LTE Advanced, 5G NR, 5G Advanced and 6G; however, it should be understood that example implementations of the present disclosure may be equally applicable to non-3GPP technologies such as IEEE 802, Bluetooth and Bluetooth Low Energy.

Further, as used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); or (c) hardware circuit (s) and/or processor(s), such as a microprocessor(s) or a portion of a microprocessor(s), that requires software (e.g., firmware) for operation, but the software may not be present when it is not needed for operation.

The above definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 1:
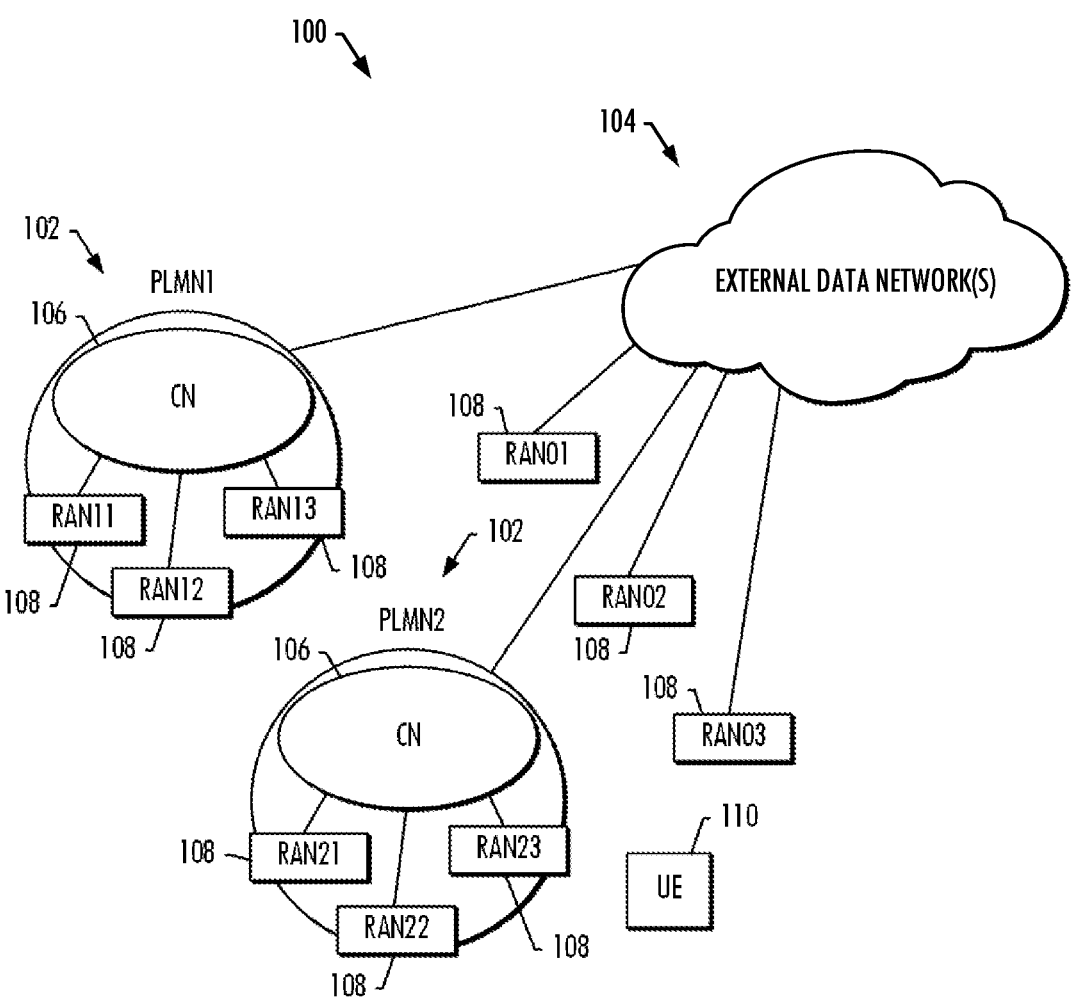
FIG. 1 illustrates a telecommunications system that includes one or more public land mobile networks (PLMNs) coupled to one or more external data networks, according to some example implementations of the present disclosure.

FIG. 1 illustrates a telecommunications system 100 according to various example implementations of the present disclosure. The telecommunications system generally includes one or more telecommunications networks. As shown, for example, the system includes one or more public land mobile networks (PLMNs) 102 coupled to one or more other external data networks 104—notably including a wide area network (WAN) such as the Internet. Each of the PLMNs includes a core network (CN) 106 backbone such as the Evolved Packet Core (EPC) of LTE, the 5G core network (5GC) or the like; and each of the core networks and the Internet are coupled to one or more radio access networks (RANs) 108, air interfaces or the like that implement one or more radio access technologies (RATs). As used herein, a "network device" refers to any suitable device at a network side of a telecommunications network. Examples of suitable network devices are described in greater detail below.

In addition, the system includes one or more radio units that may be varyingly known as user equipment (UE) 110, terminal device, terminal equipment, mobile station or the like. The UE is generally a device configured to communicate with a network device or a further UE in a telecommunications network. The UE may be a portable computer (e.g., laptop, notebook, tablet computer), mobile phone (e.g., cell phone, smartphone), wearable computer (e.g., smartwatch), or the like. In other examples, the UE may be an Internet of things (IoT) device, an industrial IoT (IIOT device), a vehicle equipped with a vehicle-to-everything (V2X) communication technology, or the like. In some examples, as referenced by 3GPP, the UE may be a narrowband IoT (NB-IoT) device, an enhanced machine-type communication (eMTC) device, a reduced capability (RedCap) device, an ambient IoT device, or the like.

In operation, these UEs 110 may be configured to connect to one or more of the RANs 108 according to their particular radio access technologies to thereby access a particular CN 106 of a PLMN 102, or to access one or more of the external data networks 104 (e.g., the Internet). The external data network may be configured to provide Internet access, operator services, 3rd party services, etc. For example, the International Telecommunication Union (ITU) has classified 5G mobile network services into three categories: enhanced mobile broadband (eMBB), ultra-reliable and low-latency communications (URLLC), and massive machine type communications (mMTC) or massive internet of things (MIoT).

Examples of radio access technologies include 3GPP radio access technologies such as GSM, UMTS, LTE, LTE Advanced, 5G NR, 5G Advanced, and 6G. Other examples of radio access technologies include IEEE 802 technologies such as IEEE 802.11 (Wi-Fi), IEEE 802.15 (including 802.15.1 (WPAN/Bluetooth), 802.15.4 (Zigbee) and 802.15.6 (WBAN)), Bluetooth, Bluetooth Low Energy (BLE), ultra wideband (UWB), and the like. Generally, a radio access technology may refer to any 2G, 3G, 4G, 5G, 6G or higher generation mobile communication technology and their different versions, as well as to any other wireless radio access technology that may be arranged to interwork with such a mobile communication technology to provide access to the CN 106 of a mobile network operator (MNO).

In various examples, a RAN 108 may be configured as one or more macrocells, microcells, picocells, femtocells or the like. The RAN may generally include one or more radio access nodes that are configured to interact with UEs 110. In various examples, a radio access node may be referred to as a base station (BS), access point (AP), base transceiver station (BTS), Node B (NB), evolved NB (eNB), macro BS, NB (MNB) or eNB (MeNB), home BS, NB (HNB) or eNB (HeNB), next generation NB (gNB), enhanced gNB (en-gNB), next generation eNB (ng-eNB), or the like. The RAN may include some type of network controlling/governing entity responsible for control of the radio access nodes. The network controlling/governing entity and radio access node may be separate or integrated into a single apparatus. The network controlling/governing entity may include processing circuitry configured to carry out various management functions, etc. The processing circuitry may be associated with a memory, computer-readable storage medium or database for maintaining information required in the management functions.

A RAN 108 may be centralized or distributed. In various examples, components of a RAN may be interconnected by Ethernet, Gigabit Ethernet, Asynchronous Transfer Mode (ATM), optical fiber, dark fiber, passive wavelength division multiplexing (WDM), WDM passive optical network (WDM-PON), optical transport network (OTN), time sensitive networking (TSN) and/or any other data link layer network, possibly including radio links. The RAN may be connected to a CN 106 through one or more gateways, network functions or the like.

Figure 2:
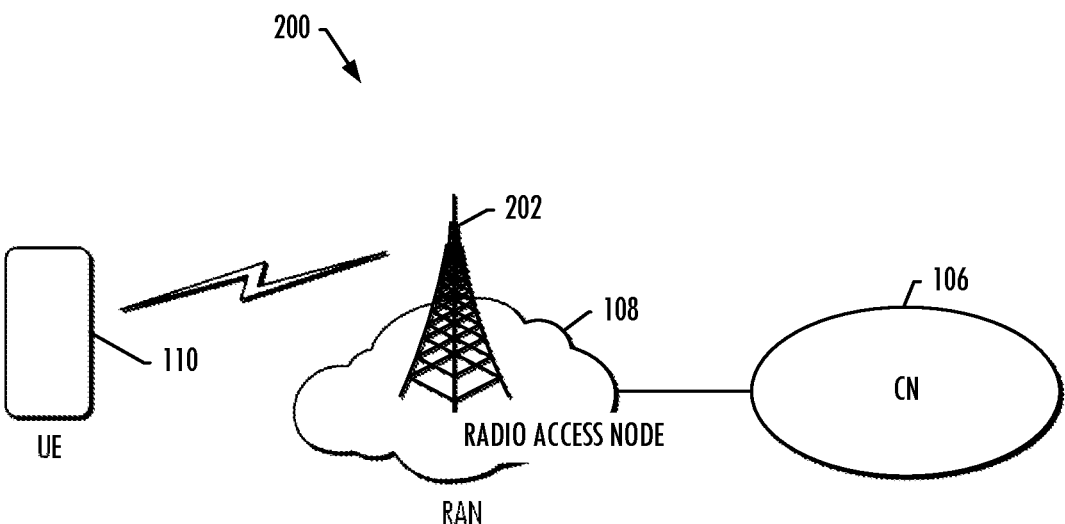
FIG. 2 illustrates a deployment of a PLMN, according to some example implementations.

As will be appreciated, a PLMN 102 may be deployed in a number of different manners. FIG. 2 illustrates a deployment 200 of a PLMN, such as a 4G LTE, 5G or 6G deployment, according to some example implementations. As shown, the deployment includes a CN 106, and RAN 108 with one or more radio access nodes 202 configured to interact with UEs 110. In a 4G LTE deployment, the EPC is the CN, and the evolved UMTS terrestrial radio access network (E-UTRAN) is the RAN; and the E-UTRAN includes one or more eNBs (radio access nodes) configured to connect UEs to the E-UTRAN to thereby access the EPC. Similarly, in a 5G deployment, the 5GC is the CN 106, and the next generation (NG) radio access network (NG-RAN) is the RAN 108; and the NG-RAN includes one or more gNBs (radio access nodes) configured to connect UEs 110 to the NG-RAN to thereby access the 5GC. The term 'gNB' in 5G may correspond to the eNB in 4G LTE.

Some deployments of 4G LTE and 5G in particular are considered standalone (SA) deployments. Other deployments combine 4G LTE and 5G technologies, and are referred to as non-standalone (NSA) deployments. In some deployments, the E-UTRAN includes one or more ng-eNBs that are configured to communicate with the 5GC, and that may also be configured to communicate with one or more gNBs. Similarly, in another deployment, the NG-RAN may include one or more en-gNBs that are configured to communicate with the EPC, and that may also be configured to communicate with one or more eNBs. In various instances, a single UE 110, a dual-mode or multimode UE, may support multiple (two or more) RANs—thereby being configured to connect to multiple RANs, such as 4G LTE and 5G.

In some deployments, such as deployment 200, operations of the radio access node 202 may be carried out, at least partly, in a central/centralized unit (CU), such as a server, host or node, operationally coupled to a distributed unit (DU), such as a radio head/node. It is also possible that node operations may be distributed among a plurality of servers, hosts or nodes.

It should also be understood that the distribution of work between CN 106 operations and radio access node 202 operations may vary depending on implementation. Thus, a 5G network architecture may be based on a so-called CU-DU split. One gNB-CU (central node) may control one or more gNB-DUs. The gNB-CU may control a plurality of spatially separated gNB-DUs, acting at least as transmit/receive (Tx/Rx) nodes. In some example implementations, however, the gNB-DUs (also called DU) may include, for example, a radio link control (RLC), medium access control (MAC) layer and a physical (PHY) layer, whereas the gNB-CU (also called a CU) may include the layers above the RLC layer, such as a packet data convergence protocol (PDCP) layer, a radio resource control (RRC), and an internet protocol (IP) layer. Other functional splits are also possible. It is considered that a skilled person is familiar with the open systems interconnection (OSI) model and the functionalities within each layer.

In some example implementations, the server or CU may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU, and the boundary where the responsibility is shifted between the CU and the DU may be selected according to implementation.

Discontinuous reception (DRX) is a method for reducing battery consumption by allowing a UE 110 discontinuously monitor a downlink channel, such as a physical downlink control channel (PDCCH), from the radio access node 202 so as to reduce the UE's battery consumption. The UE otherwise continuously monitors the downlink channel. With the DRX configured, one or more timers may be configured to indicate when a UE is in an active state for the reception and/or when the UE is in a sleep state where the monitoring or reception is not performed.

Figure 3:
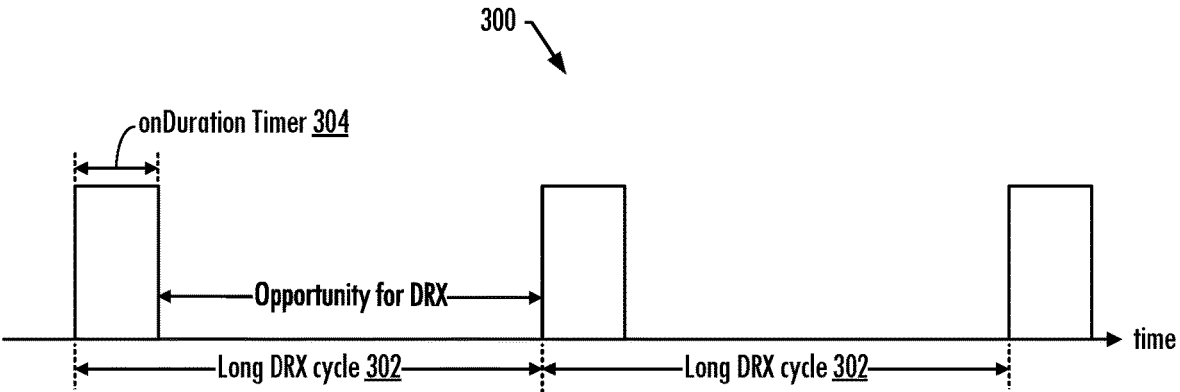
FIG. 3 illustrates basic discontinuous reception (DRX) operation.

To better understand the DRX, FIG. 3 illustrates basic DRX operation 300. As shown, a DRX cycle specifies periodic repetition of the on-duration followed by a possible extended period of time. The DRX cycle includes an on-duration and an off-duration. The on-duration is an active time during which the UE 110 is active to monitor PDCCH for downlink control information (DCI) from the radio access node 202. The off-duration is a duration in which the UE is in a sleep state and does not monitor the PDCCH. The DRX cycle may be various types. In some examples, the DRX cycle may be a long DRX cycle or a short DRX cycle. The long DRX cycle which has a long period can minimize battery consumption of the UE. The short DRX cyclic which has a short period can minimize a data transmission delay.

An active time for the UE 110 in a DRX cycle may include an on-duration in which the PDCCH is periodically monitored and a duration in which the PDCCH is monitored due to an event occurrence. The active time may be defined by one or more timers set for DRX. As shown in FIG. 3, in a long DRX cycle 302, an on-duration timer (also referred to as an onDuration timer 304) is running. In the basic DRX operation, an active time coincides with a duration in which the onDuration timer is running. The onDuration timer may be set to a predetermined timer value and in some examples, may specify the number of consecutive subframe(s) for the PDCCH at the beginning of a DRX cycle. A subframe for DCI refers to a subframe in which the PDCCH is monitored. A plurality of onDuration timers having the same timer value may be started at the beginning of DRX cycles. As shown, another onDuration timer is started at a next DRX cycle.

Figure 4:
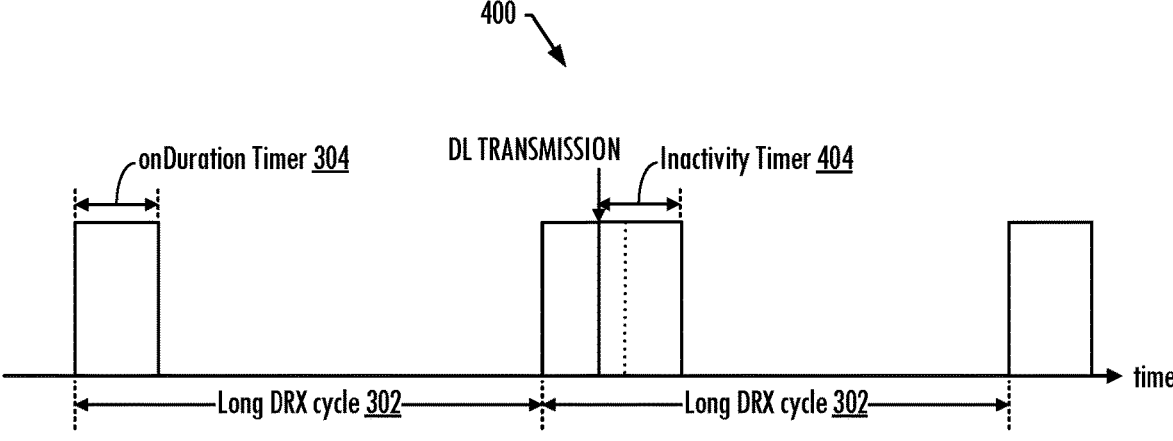
FIG. 4 illustrates DRX operation with an inactivity timer.

In addition to the onDuration timer 304 (drx-onDuration-Timer), one or more additional timers may be set for DRX depending on the occurrence of certain events. In some examples, the active time in a DRX cycle 302 may be extended due to the additional timers. FIG. 4 illustrates DRX operation 400 with an inactivity timer. As shown, the length of an active time in one of the DRX cycles is extended as compared to the active time in other DRX cycles. This is because an inactivity timer 404 (drx-Inactivity Timer) is started when the UE 110 receives and successfully decodes DCI while the onDuration timer 304 is running for that DRX cycle.

The inactivity timer 404 keeps the UE 110 monitoring the PDCCH. The inactivity timer indicates a duration after which if no activity is detected over a channel, the UE may enter the off-duration of the DRX cycle 302. If the inactivity timer is running, the UE may continuously monitor the PDCCH. The inactivity timer starts upon receiving in the DCI an initial grant for an uplink (UL) transmission, or a grant for a downlink (DL) transmission. The inactivity timer may be set to a predetermined timer value and may, for example, specify the number of consecutive subframe(s) for the PDCCH after successfully decoding previous DCI indicating an initial UL or DL transmission for the UE. As shown in FIG. 4, due to the inactivity timer, the active time in one of the DRX cycles is extended.

In addition to the inactivity timer or as an alternative, the UE 110 may operate some other timers in DRX, such as one or more Hybrid Automatic Repeat request (HARQ) round trip time (RTT) timers, one or more retransmission timers, a contention resolution timer, and the like. A HARQ RTT timer defines a minimum duration which the UE expects to elapse prior to a DL assignment for a HARQ retransmission. A retransmission timer defines a duration in which the UE monitors the PDCCH while expecting a retransmission.

Figure 5:
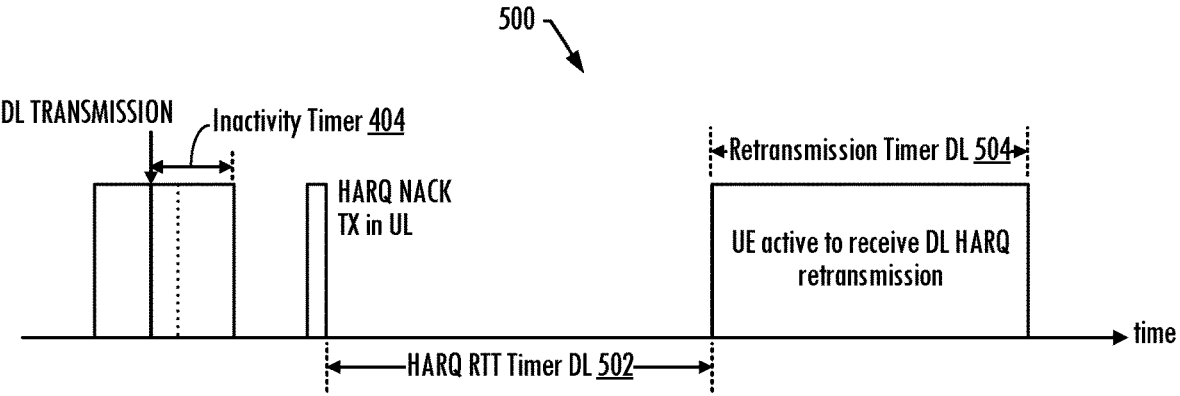
FIG. 5 illustrates DRX operation including downlink retransmission handling.

FIG. 5 illustrates DRX operation 500 including DL retransmission handling. As shown, a HARQ RTT timer DL 502 (drx-HARQ-RTT-TimerDL) may specify the minimum duration before a DL assignment for a DL HARQ retransmission is expected by the UE 110. A retransmission timer DL 504 (drx-RetransmissionTimerDL) may specify the maximum duration that the UE monitors the PDCCH while expecting a DL retransmission. The HARQ RTT timer DL is started after transmission of HARQ feedback (e.g., negative acknowledgement (NACK)) for a DL transmission; and when the HARQ RTT timer DL expires, the retransmission timer DL is started. The UE may monitor the PDCCH for a DL HARQ retransmission while the retransmission timer DL is running.

Figure 6:
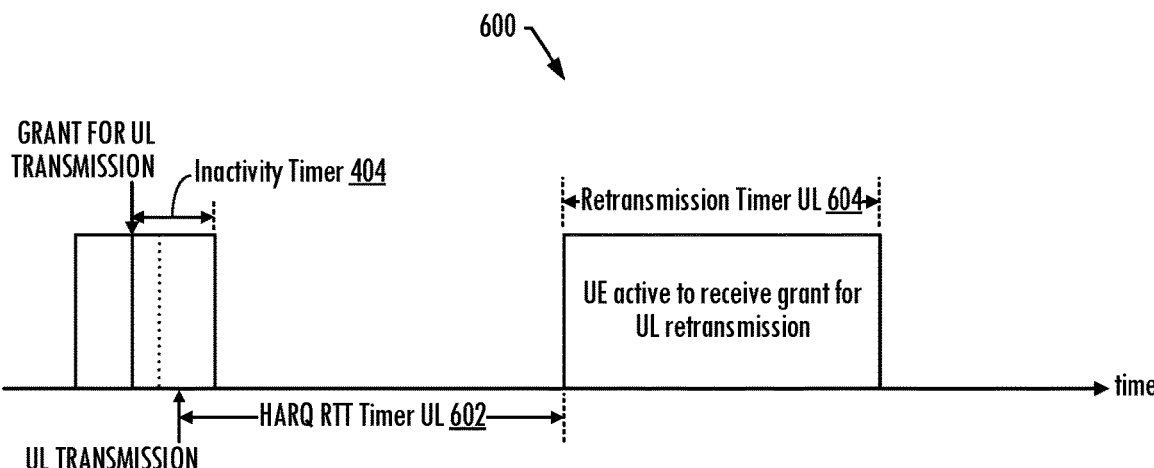
FIG. 6 illustrates DRX operation including uplink retransmission handling.

FIG. 6 illustrates DRX operation 600 including UL retransmission handling. As shown, a HARQ RTT timer UL 602 (drx-HARQ-RTT-TimerUL) may specify the minimum duration before a UL HARQ retransmission grant is expected by the UE 110. A retransmission timer UL 604 (drx-RetransmissionTimerUL) may specify the maximum duration that the UE monitors the PDCCH while expecting a grant for UL retransmission. As shown, the inactivity timer 404 may be started upon receipt of a grant for an uplink transmission. The HARQ RTT timer UL is started after the uplink transmission; and when the HARQ RTT timer UL expires, the retransmission timer UL is started. The UE may monitor the PDCCH for a grant for UL HARQ retransmission while the retransmission timer UL is running.

As described above, the active time during which the UE 110 is monitoring the PDCCH may include the time while any of the onDuration timer, the inactivity timer, the retransmission timer DL or the retransmission timer UL is running. These timers may at times therefore also be referred to as awake timers. One or more of the awake timers may at varying times overlap, and this overlap may reduce the reduces the awake time and UE energy usage as compared to the case where, for example, those timers were running sequentially.

Network scheduling flexibility for HARQ retransmissions where the UE 110 is using DRX/sleep is limited by the window during which the retransmission timer is running (at times referred to as a retransmission window). The current solution is therefore to configure a "longer" contiguous retransmission window with a length configured by RRC. This "longer" contiguous retransmission window length needs to provide the scheduler sufficient flexibility so the scheduler is sufficiently likely to be able to schedule a downlink retransmission or grant for an uplink transmission before the end of the respective retransmission window. The UE DRX sleep, however, may prevent the network from scheduling retransmissions with the needed time diversity.

Configuring more UE awake time (e.g., with longer awake timers, shorter DRX cycle) increases drain on the battery of the UE 110. More frequent wake-up signaling creates increased overhead for the UE checking the wakeup signal/DCI of power saving (DCP). DCI signaling to frequently tell UE if the next active time is needed also creates extra overhead. The UE battery life may also degrade with a longer UL retransmission window (retransmission timer UL 604). In this regard, the UL retransmission window may result in a particularly significant amount of additional awake time because in the majority of cases in which the uplink transmission is successfully decoded, the UE is awake for the entire UL retransmission window (i.e., the entire duration of the retransmission timer UL).

In view of the foregoing, example implementations of the present disclosure provide a solution whereby the duration of at least one timer (e.g., inactivity timer, retransmission timer), and thereby the window during which the at least one timer is run, may be reduced (to a shorter duration or eliminated) based on its proximity to a next active time. The solution of example implementations enhances determination of the UE DRX active state. The solution of example implementations may also improve UE battery life with less total awake time or less total downlink channel decodes for a given workload. This may also result in additional time diversity within a HARQ process such that coverage is improved without needing additional physical resource block (PRB) or power resources.

Figure 7:
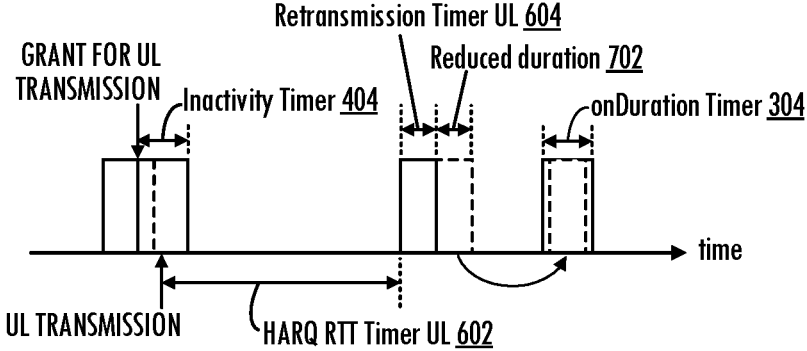
FIGS. 7 and 8 illustrate reducing respectively a retransmission timer uplink (UL) and an inactivity timer based on its proximity to a next active time, according to some example implementations.

FIG. 7 illustrates the solution according to some example implementations. As shown, the duration of the retransmission timer UL 604, and thereby the UL retransmission window, may be reduced by a duration 702 based on proximity of the UL retransmission window, to the next active time, which as shown is the next on duration (onDuration timer 304). In other examples, the next active time may be another retransmission window for another HARQ process. The UE may monitor the downlink channel for a grant for UL HARQ retransmission while the shortened retransmission timer UL is running, as well as while the next onDuration timer is running. Likewise, the radio access node 202 may schedule the grant for UL HARQ retransmission for transmission to the UE for a transmission time selected between the shortened retransmission timer UL and the next on-duration.

Figure 8:
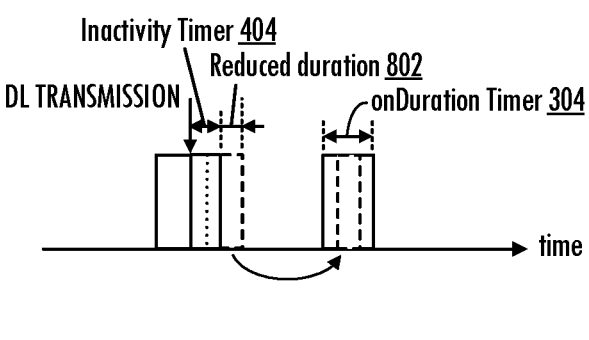

FIG. 8 illustrates the solution according to some other example implementations. As shown, the duration of the inactivity timer 404, and thereby an inactivity window during which the inactivity timer is to run, may be reduced by a duration 802 based on proximity of the inactivity window, to the next active time, which as shown is the next on duration (onDuration timer 304). Again, in other examples, the next active time may be another retransmission window for another HARQ process. The UE may monitor the downlink channel for a new downlink transmission or a grant for a new uplink and/or downlink transmission while the shortened inactivity timer is running, as well as while the next onDuration timer is running. Likewise, the radio access node 202 may send the new downlink transmission or grant at a time selected between the shortened inactivity timer and the next on-duration, so that new downlink transmission can schedule the new uplink and/or downlink transmission.

In both FIG. 7 and FIG. 8, as well as in other examples, the duration 702, 802 by which from the respective timers are reduced may be subsumed within the next active time (e.g., onDuration, retransmission timer). In some examples, this may be conceptually represented as a split of the respective timers to create secondary timers that are shifted to overlap with the next active time. Thus, the duration 702 may be represented as a secondary retransmission timer UL that is shifted to overlap with the next onDuration timer 403 (or next retransmission timer). Similarly, the duration 802 may be represented as a secondary inactivity timer that is shifted to overlap with the next onDuration timer (or next retransmission timer). In some of these examples, a secondary timer may be shifted to at least partially, if not entirely, overlap with the next active time. Likewise, in some examples, the secondary timer may begin before the next active time, or extend past the next active time.

In the context of a reduction of the retransmission timer, a longer HARQ process may result from allowing the next active time to be used for a downlink retransmission or a grant for an uplink retransmission. This in term enables an improvement in radio coverage in certain conditions, such as from time diversity/outlasting a bad portion of fades). Extra UE awake time may also be avoided, while also providing the benefit of HARQ time diversity. The network scheduler may also have the option to schedule retransmission (or next new transmission) with more or less delay, when the UE is using DRX, and the network is trying to achieve the coverage benefit of a longer (and more spread out) HARQ process.

Some example implementations of the present disclosure therefore provide a radio access node 202 that may send a configuration of parameters to a UE 110 for DRX operation in which the UE monitors a downlink channel (e.g., PDCCH) during discontinuous active times. The parameters include at least one (awake) timer that specifies a duration in which the UE is to be in an active state to monitor the downlink channel for a particular downlink transmission based on particular channel activity. In various examples, the one timer(s) may include an inactivity timer that indicates a duration after a downlink transmission that indicates a new downlink transmission or a new uplink transmission, or a downlink retransmission timer that indicates a maximum duration that the UE monitors the downlink channel while expecting a downlink retransmission. Additionally or alternatively, in some examples, the one timer(s) may include an uplink retransmission timer that indicates a maximum duration that the UE monitors the downlink channel while expecting a grant for an uplink retransmission.

The radio access node 202 and the UE 110 may detect the particular channel activity. The particular channel activity marks a beginning of a window during which the timer(s) is to run for the duration specified by the timer(s). The radio access node 202 and the UE 110 may a proximity of the window to a next active time of the discontinuous active times. The radio access node 202 and the UE 110 may reduce the duration of the timer(s), and thereby the window during which the timer(s) is to run, based on the proximity of the window to the next active time.

In some examples, duration of the timer(s) may be reduced to a shorter duration and the window thereby shortened to a shorter window. The radio access node 202 may schedule the particular downlink transmission (e.g., DCI) for a transmission time selected between the shorter window and the next active time. The UE 110 may start the timer(s) to run for the shorter duration during which the UE monitors the downlink channel for the particular downlink transmission and monitor the downlink channel for the particular downlink transmission further during the next active time.

In some examples, the duration of the timer(s) may be reduced to eliminate the timer(s), and the window thereby eliminated. The radio access node 202 may schedule the particular downlink transmission for a transmission time selected from only the next active time. The UE 110 may monitor the downlink channel for the particular downlink transmission only during the next active time.

In some examples, the duration of the inactivity timer may be reduced such that a new downlink transmission or a grant for a new uplink and/or downlink transmission is scheduled for a transmission time selected from at least the next active time. In this regard, the duration of the uplink and/or downlink retransmission timer may be reduced such that the uplink and/or downlink retransmission is scheduled for a transmission time selected from at least the next active time. Likewise, the duration of the uplink uplink and/or retransmission timer may be reduced such that the grant for the uplink retransmission is scheduled for a transmission time selected from at least the next active time.

FIG. 9 is a signaling chart 900 according to some particular example implementations. As shown, at step 901 network configures the UE 90 with one or more parameters for dynamically reducing a duration of timer(s). The radio access node 202 then at step 902 determines that a UL cyclic redundancy check (CRC) failure or UE transmission of NACK, or a NACK for a downlink transmission, and generates at least one retransmission DCI. The radio access node and the UE then at step 903 determines a proximity of a window to a next active time of discontinuous active times. The radio access node and the UE then at step 904 apply the window until the window expires, or a retransmission DCI is detected for the case of the retransmission window for that retransmission DCI. If during this slot, the retransmission DCI for the UL (and/or DL) is not detected, then the radio access node and the UE at step 905 reduce the duration of retransmission timer(s) to a shorter duration and the window is thereby shortened to a shorter window. The radio access node and the UE then at step 906 apply the shorter window until the shorter window expires or the retransmission DCI is detected. If the timer is a onDuration or an inactivity timer, then the radio access node and the UE at step 905 reduce the duration of retransmission timer(s) to a shorter duration and the window is thereby shortened to a shorter window. The radio access node and the UE then at step 906 apply the shorter window until the shorter window expires.

FIG. 10 is a flowchart illustrating various steps in a method 1000 according to various example implementations. The method includes sending a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity, as shown at block 1002 of FIG. 10A. The method includes detecting the particular channel activity, the particular channel activity marking a beginning of a window during which the at least one timer is to run for the duration specified by the at least one timer, as shown at block 1004. The method includes determining a proximity of the window to a next active time of the discontinuous active times, as shown at block 1006. And the method includes reducing the duration of the at least one timer, and thereby the window during which the at least one timer is to run, based on the proximity of the window to the next active time, as shown at block 1008.

In some examples, the duration of the at least one timer is reduced at block 1008 to a shorter duration, and the window is thereby shortened to a shorter window. In some of these examples, the method further includes scheduling the particular downlink transmission for a transmission time selected between the shorter window and the next active time.

In some examples, the duration of the at least one timer is reduced at block 1008 to eliminate the at least one timer, and the window is thereby eliminated. In some of these examples, the method further includes scheduling the particular downlink transmission for a transmission time selected from only the next active time.

In some examples, the at least one timer includes an inactivity timer that indicates a duration after a downlink transmission that indicates a new downlink transmission or a new uplink transmission. In some of these examples, the duration of the inactivity timer is reduced at block 1008 such that the new downlink transmission or a grant for the new uplink transmission is scheduled for a transmission time selected from at least the next active time.

In some examples, the at least one timer includes a downlink retransmission timer that indicates a maximum duration that the user equipment monitors the downlink channel while expecting a downlink retransmission. In some of these examples, the duration of the downlink retransmission timer is reduced at block 1008 such that the downlink retransmission is scheduled for a transmission time selected from at least the next active time.

In some examples, the at least one timer is an uplink retransmission timer that indicates a maximum duration that the user equipment monitors the downlink channel while expecting a grant for an uplink retransmission. In some of these examples, the duration of the uplink retransmission timer is reduced at block 1008 such that the grant for the uplink retransmission is scheduled for a transmission time selected from at least the next active time.

FIGS. 11A-11C are flowcharts illustrating various steps in a method 1100 according to various example implementations. The method includes receiving a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity, as shown at block 1102 of FIG. 11A. The method includes detecting the particular channel activity, the particular channel activity marking a beginning of a window during which the at least one timer is to run for the duration specified by the at least one timer, as shown at block 1104. The method includes determining a proximity of the window to a next active time of the discontinuous active times, as shown at block 1106. And the method includes reducing the duration of the at least one timer, and thereby the window during which the at least one timer is to run, based on the proximity of the window to the next active time, as shown at block 1108.

In some examples, the duration of the at least one timer is reduced at block 1108 to a shorter duration. In some of these examples, the method 1100 further includes starting the at least one timer to run for the shorter duration during which the user equipment monitors the downlink channel for the particular downlink transmission, as shown at block 1110 of FIG. 11B. And the method includes monitoring the downlink channel for the particular downlink transmission further during the next active time, as shown at block 1112.

In some examples, the duration of the at least one timer is reduced at block 1108 to eliminate the at least one timer. In some of these examples, the method 1100 further includes monitoring the downlink channel for the particular downlink transmission only during the next active time, as shown at block 1114 of FIG. 11C.

In some examples, the at least one timer includes an inactivity timer that indicates a duration after a downlink transmission that indicates a new downlink transmission or a new uplink transmission. In some of these examples, the duration of the inactivity timer is reduced at block 1108 such that the user equipment monitors the downlink channel for the new downlink transmission or a grant for the new uplink transmission at least during the next active time.

In some examples, the at least one timer includes a downlink retransmission timer that indicates a maximum duration that the user equipment monitors the downlink channel while expecting a downlink retransmission. In some of these examples, the duration of the downlink retransmission timer is reduced at block 1108 such that the user equipment monitors the downlink channel for the downlink retransmission at least during the next active time.

In some examples, the at least one timer is an uplink retransmission timer that indicates a maximum duration that the user equipment monitors the downlink channel while expecting a grant for an uplink retransmission. In some of these examples, the duration of the uplink retransmission timer is reduced at block 1108 such that the user equipment monitors the downlink channel for the grant for the uplink retransmission at least during the next active time.

According to example implementations of the present disclosure, a telecommunications system 100 or PLMN 102, and its components such as a UE 110, CN 106, RAN 108 and/or radio access node 202, may be implemented by various means. Means for implementing the system and its components may include hardware, firmware, software, or combinations thereof. In some examples, one or more apparatuses may be configured to function as or otherwise implement the system and its components shown and described herein. In examples involving more than one apparatus, the respective apparatuses may be connected to or otherwise in communication with one another in a number of different manners, such as directly or indirectly via a wired or wireless network or the like.

According to some example implementations, at least some of the method 1000 described with respect to FIG. 10 may be carried out by an apparatus comprising means for performing functions corresponding steps of the method. Similarly, at least some of the method 1100 described with respect to FIGS. 11A, 11B and 11C may be carried out by an apparatus comprising means for performing functions corresponding steps of the method. Examples of a suitable apparatus may include a gNB (e.g., gNB-DU, gNB-CU), ng-eNB or any suitable apparatus, such as a server, host or node. Other examples of a suitable apparatus may include a user equipment, user device, user terminal or the like.

FIG. 12 illustrates an apparatus 1200 in which means for performing various functions includes hardware, alone or under direction of one or more computer programs from a computer-readable storage medium or other memory, such as computer memory, according to some example implementations of the present disclosure. Generally, an apparatus of example implementations of the present disclosure may comprise, include or be embodied in one or more fixed or portable electronic devices. Examples of suitable electronic devices include a wearable computer, mobile phone, portable computer, desktop computer, workstation computer, server (server computer) or the like. The apparatus may include one or more of each of a number of components such as, for example, processing circuitry 1202 connected to computer-readable storage medium or other memory 1204.

The processing circuitry 1202 may be composed of one or more processors alone or in combination with one or more computer-readable storage media. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1204 (of the same or another apparatus).

The processing circuitry 1202 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1204 is generally any piece of computer hardware that is capable of storing information such as, for example, data, computer programs, instructions 1206 (e.g., computer-readable program code) and/or other suitable information either on a temporary basis and/or a permanent basis. The memory may include volatile and/or non-volatile memory, and may be fixed or removable. Examples of suitable memory include recording media, random access memory (RAM), read-only memory (ROM), a hard drive, a flash memory, a thumb drive, a removable computer diskette, an optical disk or some combination thereof.

The memory 1204 is a non-transitory device capable of storing information. One example of a suitable memory is a computer-readable storage medium, which is distinguishable from a computer-readable transmission medium capable of carrying information from one location to another. Examples of suitable computer-readable transmission media comprise electronic carrier signals, telecommunications signals, software distribution packages, or some combination thereof. As used herein, the term "non-transitory" is a limitation of the medium itself (i.e., tangible, not a signal) as opposed to a limitation on data storage persistency (e.g., RAM versus ROM). A computer-readable medium as described herein generally refers to a computer-readable storage medium or computer-readable transmission medium. A computer-readable medium is any entity or device capable in which information, such as one or more computer programs or portions thereof, may be stored and carried.

In addition to the memory 1204 (e.g., computer-readable storage medium), the processing circuitry 1202 may also be connected to one or more interfaces for displaying, transmitting and/or receiving information. The interfaces may include a communications interface 1208 and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1210 and/or one or more user input interfaces 1212. The display may be configured to present or otherwise display information to a user, suitable examples of which include a liquid crystal display (LCD), light-emitting diode (LED) display, organic LED (OLED) display, active-matrix OLED (AMOLED) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like.

The user interfaces may further include one or more interfaces for communicating with peripherals such as printers, scanners or the like.

Execution of the instructions 1206 by the processing circuitry 1202, or storage of the instructions in the memory 1204, supports combinations of operations for implementing example implementations of the present disclosure. In this manner, an apparatus 1200 may comprise at least one processing circuitry and at least one memory coupled to the at least one processing circuitry, where the at least one processing circuitry is configured to execute instructions stored in the at least one memory. It will also be understood that one or more functions, and combinations of functions, may be implemented by special purpose hardware-based computer systems and/or processing circuitry which perform the specified functions, or combinations of special purpose hardware and program code instructions.

Some example implementations of the present disclosure may also be carried out in the form of a computer process defined by one or more computer programs or portions thereof. Example implementations of the present disclosure may be carried out by executing at least one portion of a computer program comprising instructions. The computer program may be in source code form, object code form, or in some intermediate form. The computer program may be stored in a computer-readable medium that is readable by a computer, processing circuitry or other suitable apparatus. As indicated above, for example, the computer program may be stored in a memory, such as a computer-readable storage medium. Additionally or alternatively, for example, the computer program may be stored in a computer-readable transmission medium. The coding of software for carrying out example implementations of the present disclosure is well within the scope of a person of ordinary skill in the art.

As will be appreciated, any suitable instructions may be loaded onto a computer, a processing circuitry or other programmable apparatus from a memory or a computer-readable medium (e.g., computer-readable storage medium, computer-readable transmission medium) to produce a particular machine, such that the particular machine becomes a means for implementing the functions specified herein. The instructions may also be stored in a computer-readable medium that can direct a computer, a processing circuitry or other programmable apparatus to function in a particular manner to thereby generate a particular machine or particular article of manufacture. In some examples, the instructions stored in the computer-readable medium may produce an article of manufacture, where the article of manufacture becomes a means for implementing functions described herein. The instructions may be retrieved from a computer-readable medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of instructions comprising program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

As explained above and reiterated below, the present disclosure includes, without limitation, the following example implementations.

Clause 1. An apparatus comprising: at least one memory configured to store instructions; and at least one processing circuitry configured to access the at least one memory, and execute the instructions to cause the apparatus to at least: send a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity; detect the particular channel activity, the particular channel activity marking a beginning of a window during which the at least one timer is to run for the duration specified by the at least one timer; determine a proximity of the window to a next active time of the discontinuous active times; and reduce the duration of the at least one timer, and thereby the window during which the at least one timer is to run, based on the proximity of the window to the next active time.

Clause 2. The apparatus of clause 1, wherein the duration of the at least one timer is reduced to a shorter duration, and the window is thereby shortened to a shorter window, and wherein the at least one processing circuitry is configured to execute the instructions to cause the apparatus to further schedule the particular downlink transmission for a transmission time selected between the shorter window and the next active time.

Clause 3. The apparatus of clause 1 or clause 2, wherein the duration of the at least one timer is reduced to eliminate the at least one timer, and the window is thereby eliminated, and wherein the at least one processing circuitry is configured to execute the instructions to cause the apparatus to further schedule the particular downlink transmission for a transmission time selected from only the next active time.

Clause 4. The apparatus of any of clauses 1 to 3, wherein the at least one timer includes an inactivity timer that indicates a duration after a downlink transmission that indicates a new downlink transmission or a new uplink transmission, and wherein the duration of the inactivity timer is reduced such that the new downlink transmission or a grant for the new uplink transmission is scheduled for a transmission time selected from at least the next active time.

Clause 5. The apparatus of any of clauses 1 to 4, wherein the at least one timer includes a downlink retransmission timer that indicates a maximum duration that the user equipment monitors the downlink channel while expecting a downlink retransmission, and wherein the duration of the downlink retransmission timer is reduced such that the downlink retransmission is scheduled for a transmission time selected from at least the next active time.

Clause 6. The apparatus of any of clauses 1 to 5, wherein the at least one timer is an uplink retransmission timer that indicates a maximum duration that the user equipment monitors the downlink channel while expecting a grant for an uplink retransmission, wherein the duration of the uplink retransmission timer is reduced such that the grant for the uplink retransmission is scheduled for a transmission time selected from at least the next active time.

Clause 7. An apparatus comprising: means for sending a configuration of parameters for discontinuous reception (DRX) operation in which an user equipment monitors a downlink channel during discontinuous active times, the parameters including at least one timer that specifies a duration in which the user equipment is to be in an active state to monitor the downlink channel for a particular downlink transmission based on particular channel activity; means for detecting the particular channel activity, the particular channel activity marking a beginning of a window during which the at least one timer is to run for the duration specified by the at least one timer; means for determining a proximity of the window to a next active time of the discontinuous active times; and means for reducing the duration of the at least one timer, and thereby the window during which the at least one timer is to run, based on the proximity of the window to the next active time.

Clause 8. The apparatus of clause 7, wherein the duration of the at least one timer is reduced to a shorter duration, and the window is thereby shortened to a shorter window, and wherein the apparatus further comprises means for scheduling the particular downlink transmission for a transmission time selected between the shorter window and the next active time.

Clause 9. The apparatus of clause 7 or clause 8, wherein the duration of the at least one timer is reduced to eliminate the at least one timer, and the window is thereby eliminated, and wherein the apparatus further comprises means for scheduling the particular downlink transmission for a transmission time selected from only the next active time.

Clause 10. The apparatus of any of clauses 7 to 9, wherein the at least one timer includes an inactivity timer that indicates a duration after a downlink transmission that indicates a new downlink transmission or a new uplink transmission, and wherein the duration of the inactivity timer is reduced such that the new downlink transmission or a grant for the new uplink transmission is scheduled for a transmission time selected from at least the next active time.

Clause 11. The apparatus of any of clauses 7 to 10, wherein the at least one timer includes a downlink retransmission timer that indicates a maximum duration that the user equipment monitors the downlink channel while expecting a downlink retransmission, and wherein the duration of the downlink retransmission timer is reduced such that the downlink retransmission is scheduled for a transmission time selected from at least the next active time.

Clause 12. The apparatus of any of clauses 7 to 11, wherein the at least one timer is an uplink retransmission timer that indicates a maximum duration that the user equipment monitors the downlink channel while expecting a grant for an uplink retransmission, wherein the duration of the uplink retransmission timer is reduced such that the grant for the uplink retransmission is scheduled for a transmission time selected from at least the next active time.

Clause 13. A method comprising: sending a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity; detecting the particular channel activity, the particular channel activity marking a beginning of a window during which the at least one timer is to run for the duration specified by the at least one timer; determining a proximity of the window to a next active time of the discontinuous active times; and reducing the duration of the at least one timer, and thereby the window during which the at least one timer is to run, based on the proximity of the window to the next active time.

Clause 14. The method of clause 13, wherein the duration of the at least one timer is reduced to a shorter duration, and the window is thereby shortened to a shorter window, and wherein the method further comprises scheduling the particular downlink transmission for a transmission time selected between the shorter window and the next active time.

Clause 15. The method of clause 13 or clause 14, wherein the duration of the at least one timer is reduced to eliminate the at least one timer, and the window is thereby eliminated, and wherein the method further comprises scheduling the particular downlink transmission for a transmission time selected from only the next active time.

Clause 16. The method of any of clauses 13 to 15, wherein the at least one timer includes an inactivity timer that indicates a duration after a downlink transmission that indicates a new downlink transmission or a new uplink transmission, and wherein the duration of the inactivity timer is reduced such that the new downlink transmission or a grant for the new uplink transmission is scheduled for a transmission time selected from at least the next active time.

Clause 17. The method of any of clauses 13 to 16, wherein the at least one timer includes a downlink retransmission timer that indicates a maximum duration that the user equipment monitors the downlink channel while expecting a downlink retransmission, and wherein the duration of the downlink retransmission timer is reduced such that the downlink retransmission is scheduled for a transmission time selected from at least the next active time.

Clause 18. The method of any of clauses 13 to 17, wherein the at least one timer is an uplink retransmission timer that indicates a maximum duration that the user equipment monitors the downlink channel while expecting a grant for an uplink retransmission, wherein the duration of the uplink retransmission timer is reduced such that the grant for the uplink retransmission is scheduled for a transmission time selected from at least the next active time.

Clause 19. A computer-readable storage medium that is non-transitory and has instructions stored therein that, in response to execution by at least one processing circuitry, causes an apparatus to at least: send a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity; detect the particular channel activity, the particular channel activity marking a beginning of a window during which the at least one timer is to run for the duration specified by the at least one timer; determine a proximity of the window to a next active time of the discontinuous active times; and reduce the duration of the at least one timer, and thereby the window during which the at least one timer is to run, based on the proximity of the window to the next active time.

Clause 20. The computer-readable storage medium of clause 19, wherein the duration of the at least one timer is reduced to a shorter duration, and the window is thereby shortened to a shorter window, and wherein the computer-readable storage medium has further instructions stored therein that, in response to execution by the at least one processing circuitry, causes the apparatus to further schedule the particular downlink transmission for a transmission time selected between the shorter window and the next active time.

Clause 21. The computer-readable storage medium of clause 19 or clause 20, wherein the duration of the at least one timer is reduced to eliminate the at least one timer, and the window is thereby eliminated, and wherein the computer-readable storage medium has further instructions stored therein that, in response to execution by the at least one processing circuitry, causes the apparatus to further schedule the particular downlink transmission for a transmission time selected from only the next active time.

Clause 22. The computer-readable storage medium of any of clauses 19 to 21, wherein the at least one timer includes an inactivity timer that indicates a duration after a downlink transmission that indicates a new downlink transmission or a new uplink transmission, and wherein the duration of the inactivity timer is reduced such that the new downlink transmission or a grant for the new uplink transmission is scheduled for a transmission time selected from at least the next active time.

Clause 23. The computer-readable storage medium of any of clauses 19 to 22, wherein the at least one timer includes a downlink retransmission timer that indicates a maximum duration that the user equipment monitors the downlink channel while expecting a downlink retransmission, and wherein the duration of the downlink retransmission timer is reduced such that the downlink retransmission is scheduled for a transmission time selected from at least the next active time.

Clause 24. The computer-readable storage medium of any of clauses 19 to 23, wherein the at least one timer is an uplink retransmission timer that indicates a maximum duration that the user equipment monitors the downlink channel while expecting a grant for an uplink retransmission, wherein the duration of the uplink retransmission timer is reduced such that the grant for the uplink retransmission is scheduled for a transmission time selected from at least the next active time.

Clause 25. An apparatus comprising means for performing the method of any of clauses 13 to 18.

Clause 26. A computer-readable medium comprising instructions that, in response to execution by at least one processing circuitry, causes an apparatus to perform the method of any of clauses 13 to 18.

Clause 27. A computer-readable storage medium comprising instructions that, in response to execution by at least one processing circuitry, causes an apparatus to perform the method of any of clauses 13 to 18.

Clause 28. A computer program comprising instructions that, in response to execution by at least one processing circuitry, causes an apparatus to perform the method of any of clauses 13 to 18.

Clause 29. An apparatus comprising: at least one memory configured to store instructions; and at least one processing circuitry configured to access the at least one memory, and execute the instructions to cause the apparatus to at least: receive a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity; detect the particular channel activity, the particular channel activity marking a beginning of a window during which the at least one timer is to run for the duration specified by the at least one timer; determine a proximity of the window to a next active time of the discontinuous active times; and reduce the duration of the at least one timer, and thereby the window during which the at least one timer is to run, based on the proximity of the window to the next active time.

Clause 30. The apparatus of clause 29, wherein the duration of the at least one timer is reduced to a shorter duration, and the at least one processing circuitry is configured to execute the instructions to cause the apparatus to further at least: start the at least one timer to run for the shorter duration during which the user equipment monitors the downlink channel for the particular downlink transmission; and monitor the downlink channel for the particular downlink transmission further during the next active time.

Clause 31. The apparatus of clause 29 or clause 30, wherein the duration of the at least one timer is reduced to eliminate the at least one timer, and the at least one processing circuitry is configured to execute the instructions to cause the apparatus to further at least: monitor the downlink channel for the particular downlink transmission only during the next active time.

Clause 32. The apparatus of any of clauses 29 to 31, wherein the at least one timer includes an inactivity timer that indicates a duration after a downlink transmission that indicates a new downlink transmission or a new uplink transmission, and wherein the duration of the inactivity timer is reduced such that the user equipment monitors the downlink channel for the new downlink transmission or a grant for the new uplink transmission at least during the next active time.

Clause 33. The apparatus of any of clauses 29 to 32, wherein the at least one timer includes a downlink retransmission timer that indicates a maximum duration that the user equipment monitors the downlink channel while expecting a downlink retransmission, and wherein the duration of the downlink retransmission timer is reduced such that the user equipment monitors the downlink channel for the downlink retransmission at least during the next active time.

Clause 34. The apparatus of any of clauses 29 to 33, wherein the at least one timer is an uplink retransmission timer that indicates a maximum duration that the user equipment monitors the downlink channel while expecting a grant for an uplink retransmission, and wherein the duration of the uplink retransmission timer is reduced such that the user equipment monitors the downlink channel for the grant for the uplink retransmission at least during the next active time.

Clause 35. An apparatus comprising: means for receiving a configuration of parameters for discontinuous reception (DRX) operation in which an user equipment monitors a downlink channel during discontinuous active times, the parameters including at least one timer that specifies a duration in which the user equipment is to be in an active state to monitor the downlink channel for a particular downlink transmission based on particular channel activity; means for detecting the particular channel activity, the particular channel activity marking a beginning of a window during which the at least one timer is to run for the duration specified by the at least one timer; means for determining a proximity of the window to a next active time of the discontinuous active times; and means for reducing the duration of the at least one timer, and thereby the window during which the at least one timer is to run, based on the proximity of the window to the next active time.

Clause 36. The apparatus of clause 35, wherein the duration of the at least one timer is reduced to a shorter duration, and the apparatus further comprises: means for starting the at least one timer to run for the shorter duration during which the user equipment monitors the downlink channel for the particular downlink transmission; and means for monitoring the downlink channel for the particular downlink transmission further during the next active time.

Clause 37. The apparatus of clause 35 or clause 36, wherein the duration of the at least one timer is reduced to eliminate the at least one timer, and the apparatus further comprises: means for monitoring the downlink channel for the particular downlink transmission only during the next active time.

Clause 38. The apparatus of any of clauses 35 to 37, wherein the at least one timer includes an inactivity timer that indicates a duration after a downlink transmission that indicates a new downlink transmission or a new uplink transmission, and wherein the duration of the inactivity timer is reduced such that the user equipment monitors the downlink channel for the new downlink transmission or a grant for the new uplink transmission at least during the next active time.

Clause 39. The apparatus of any of clauses 35 to 38, wherein the at least one timer includes a downlink retransmission timer that indicates a maximum duration that the user equipment monitors the downlink channel while expecting a downlink retransmission, and wherein the duration of the downlink retransmission timer is reduced such that the user equipment monitors the downlink channel for the downlink retransmission at least during the next active time.

Clause 40. The apparatus of any of clauses 35 to 39, wherein the at least one timer is an uplink retransmission timer that indicates a maximum duration that the user equipment monitors the downlink channel while expecting a grant for an uplink retransmission, and wherein the duration of the uplink retransmission timer is reduced such that the user equipment monitors the downlink channel for the grant for the uplink retransmission at least during the next active time.

Clause 41. A method comprising: receiving a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity; detecting the particular channel activity, the particular channel activity marking a beginning of a window during which the at least one timer is to run for the duration specified by the at least one timer; determining a proximity of the window to a next active time of the discontinuous active times; and reducing the duration of the at least one timer, and thereby the window during which the at least one timer is to run, based on the proximity of the window to the next active time.

Clause 42. The method of clause 41, wherein the duration of the at least one timer is reduced to a shorter duration, and the method further comprises: starting the at least one timer to run for the shorter duration during which the user equipment monitors the downlink channel for the particular downlink transmission; and monitoring the downlink channel for the particular downlink transmission further during the next active time.

Clause 43. The method of clause 41 or clause 42, wherein the duration of the at least one timer is reduced to eliminate the at least one timer, and the method further comprises: monitoring the downlink channel for the particular downlink transmission only during the next active time.

Clause 44. The method of any of clauses 41 to 43, wherein the at least one timer includes an inactivity timer that indicates a duration after a downlink transmission that indicates a new downlink transmission or a new uplink transmission, and wherein the duration of the inactivity timer is reduced such that the user equipment monitors the downlink channel for the new downlink transmission or a grant for the new uplink transmission at least during the next active time.

Clause 45. The method of any of clauses 41 to 44, wherein the at least one timer includes a downlink retransmission timer that indicates a maximum duration that the user equipment monitors the downlink channel while expecting a downlink retransmission, and wherein the duration of the downlink retransmission timer is reduced such that the user equipment monitors the downlink channel for the downlink retransmission at least during the next active time.

Clause 46. The method of any of clauses 41 to 45, wherein the at least one timer is an uplink retransmission timer that indicates a maximum duration that the user equipment monitors the downlink channel while expecting a grant for an uplink retransmission, and wherein the duration of the uplink retransmission timer is reduced such that the user equipment monitors the downlink channel for the grant for the uplink retransmission at least during the next active time.

Clause 47. A computer-readable storage medium that is non-transitory and has instructions stored therein that, in response to execution by at least one processing circuitry, causes an apparatus to at least: receive a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity; detect the particular channel activity, the particular channel activity marking a beginning of a window during which the at least one timer is to run for the duration specified by the at least one timer; determine a proximity of the window to a next active time of the discontinuous active times; and reduce the duration of the at least one timer, and thereby the window during which the at least one timer is to run, based on the proximity of the window to the next active time.

Clause 48. The computer-readable storage medium of clause 47, wherein the duration of the at least one timer is reduced to a shorter duration, and the computer-readable storage medium has further instructions stored therein that, in response to execution by the at least one processing circuitry, causes the apparatus to further at least: start the at least one timer to run for the shorter duration during which the user equipment monitors the downlink channel for the particular downlink transmission; and monitor the downlink channel for the particular downlink transmission further during the next active time.

Clause 49. The computer-readable storage medium of clause 47 or clause 48, wherein the duration of the at least one timer is reduced to eliminate the at least one timer, and the computer-readable storage medium has further instructions stored therein that, in response to execution by the at least one processing circuitry, causes the apparatus to further at least: monitor the downlink channel for the particular downlink transmission only during the next active time.

Clause 50. The computer-readable storage medium of any of clauses 47 to 49, wherein the at least one timer includes an inactivity timer that indicates a duration after a downlink transmission that indicates a new downlink transmission or a new uplink transmission, and wherein the duration of the inactivity timer is reduced such that the user equipment monitors the downlink channel for the new downlink transmission or a grant for the new uplink transmission at least during the next active time.

Clause 51. The computer-readable storage medium of any of clauses 47 to 50, wherein the at least one timer includes a downlink retransmission timer that indicates a maximum duration that the user equipment monitors the downlink channel while expecting a downlink retransmission, and wherein the duration of the downlink retransmission timer is reduced such that the user equipment monitors the downlink channel for the downlink retransmission at least during the next active time.

Clause 52. The computer-readable storage medium of any of clauses 47 to 51, wherein the at least one timer is an uplink retransmission timer that indicates a maximum duration that the user equipment monitors the downlink channel while expecting a grant for an uplink retransmission, and wherein the duration of the uplink retransmission timer is reduced such that the user equipment monitors the downlink channel for the grant for the uplink retransmission at least during the next active time.

Clause 53. An apparatus comprising means for performing the method of any of clauses 41 to 46.

Clause 54. A computer-readable medium comprising instructions that, in response to execution by at least one processing circuitry, causes an apparatus to perform the method of any of clauses 41 to 46.

Clause 55. A computer-readable storage medium comprising instructions that, in response to execution by at least one processing circuitry, causes an apparatus to perform the method of any of clauses 41 to 46.

Clause 56. A computer program comprising instructions that, in response to execution by at least one processing circuitry, causes an apparatus to perform the method of any of clauses 41 to 46.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:

at least one memory configured to store instructions; and at least one processing circuitry configured to access the at least one memory, and execute the instructions to cause the apparatus to at least:

send a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity;

detect the particular channel activity, the particular channel activity marking a beginning of a window during which the at least one timer is to run for the duration specified by the at least one timer;

determine a proximity of the window to a next active time of the discontinuous active times; and reduce the duration of the at least one timer, and thereby the window during which the at least one timer is to run, based on the proximity of the window to the next active time.

2. The apparatus of claim 1, wherein the duration of the at least one timer is reduced to a shorter duration, and the window is thereby shortened to a shorter window, and wherein the at least one processing circuitry is configured to execute the instructions to cause the apparatus to further schedule the particular downlink transmission for a transmission time selected between the shorter window and the next active time.

3. The apparatus of claim 1, wherein the duration of the at least one timer is reduced to eliminate the at least one timer, and the window is thereby eliminated, and wherein the at least one processing circuitry is configured to execute the instructions to cause the apparatus to further schedule the particular downlink transmission for a transmission time selected from only the next active time.

4. The apparatus of claim 1, wherein the at least one timer includes an inactivity timer that indicates a duration after a downlink transmission that indicates a new downlink transmission or a new uplink transmission, and wherein the duration of the inactivity timer is reduced such that the new downlink transmission or a grant for the new uplink transmission is scheduled for a transmission time selected from at least the next active time.

5. The apparatus of claim 1, wherein the at least one timer includes a downlink retransmission timer that indicates a maximum duration that the user equipment monitors the downlink channel while expecting a downlink retransmission, and wherein the duration of the downlink retransmission timer is reduced such that the downlink retransmission is scheduled for a transmission time selected from at least the next active time.

6. The apparatus of claim 1, wherein the at least one timer is an uplink retransmission timer that indicates a maximum duration that the user equipment monitors the downlink channel while expecting a grant for an uplink retransmission, wherein the duration of the uplink retransmission timer is reduced such that the grant for the uplink retransmission is scheduled for a transmission time selected from at least the next active time.

7. An apparatus comprising:

at least one memory configured to store instructions; and at least one processing circuitry configured to access the at least one memory, and execute the instructions to cause the apparatus to at least:

receive a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity;

detect the particular channel activity, the particular channel activity marking a beginning of a window during which the at least one timer is to run for the duration specified by the at least one timer;

determine a proximity of the window to a next active time of the discontinuous active times; and reduce the duration of the at least one timer, and thereby the window during which the at least one timer is to run, based on the proximity of the window to the next active time.

8. The apparatus of claim 7, wherein the duration of the at least one timer is reduced to a shorter duration, and the at least one processing circuitry is configured to execute the instructions to cause the apparatus to further at least:

start the at least one timer to run for the shorter duration during which the user equipment monitors the downlink channel for the particular downlink transmission; and monitor the downlink channel for the particular downlink transmission further during the next active time.

9. The apparatus of claim 7, wherein the duration of the at least one timer is reduced to eliminate the at least one timer, and the at least one processing circuitry is configured to execute the instructions to cause the apparatus to further at least:

monitor the downlink channel for the particular downlink transmission only during the next active time.

10. The apparatus of claim 7, wherein the at least one timer includes an inactivity timer that indicates a duration after a downlink transmission that indicates a new downlink transmission or a new uplink transmission, and wherein the duration of the inactivity timer is reduced such that the user equipment monitors the downlink channel for the new downlink transmission or a grant for the new uplink transmission at least during the next active time.

11. The apparatus of claim 7, wherein the at least one timer includes a downlink retransmission timer that indicates a maximum duration that the user equipment monitors the downlink channel while expecting a downlink retransmission, and wherein the duration of the downlink retransmission timer is reduced such that the user equipment monitors the downlink channel for the downlink retransmission at least during the next active time.

12. The apparatus of claim 7, wherein the at least one timer is an uplink retransmission timer that indicates a maximum duration that the user equipment monitors the downlink channel while expecting a grant for an uplink retransmission, and wherein the duration of the uplink retransmission timer is reduced such that the user equipment monitors the downlink channel for the grant for the uplink retransmission at least during the next active time.

13. A method comprising:

sending a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity;

detecting the particular channel activity, the particular channel activity marking a beginning of a window during which the at least one timer is to run for the duration specified by the at least one timer;

determining a proximity of the window to a next active time of the discontinuous active times; and reducing the duration of the at least one timer, and thereby the window during which the at least one timer is to run, based on the proximity of the window to the next active time.

14. The method of claim 13, wherein the duration of the at least one timer is reduced to a shorter duration, and the window is thereby shortened to a shorter window, and wherein the method further comprises scheduling the particular downlink transmission for a transmission time selected between the shorter window and the next active time.

15. The method of claim 13, wherein the duration of the at least one timer is reduced to eliminate the at least one timer, and the window is thereby eliminated, and wherein the method further comprises scheduling the particular downlink transmission for a transmission time selected from only the next active time.

16. The method of claim 13, wherein the at least one timer includes an inactivity timer that indicates a duration after a downlink transmission that indicates a new downlink transmission or a new uplink transmission, and wherein the duration of the inactivity timer is reduced such that the new downlink transmission or a grant for the new uplink transmission is scheduled for a transmission time selected from at least the next active time.

17. The method of claim 13, wherein the at least one timer includes a downlink retransmission timer that indicates a maximum duration that the user equipment monitors the downlink channel while expecting a downlink retransmission, or an uplink retransmission timer that indicates a maximum duration that the user equipment monitors the downlink channel while expecting a grant for an uplink retransmission, and wherein the duration of the downlink retransmission timer is reduced such that the downlink retransmission or the grant for the uplink retransmission is scheduled for a transmission time selected from at least the next active time.

18. A method comprising:

receiving a configuration of parameters for discontinuous reception (DRX) operation in which a user equipment monitors a downlink channel during discontinuous active times, the parameters including at least one timer that specifies a duration in which the user equipment is to be in an active state to monitor the downlink channel for a particular downlink transmission based on particular channel activity;

detecting the particular channel activity, the particular channel activity marking a beginning of a window during which the at least one timer is to run for the duration specified by the at least one timer;

determining a proximity of the window to a next active time of the discontinuous active times; and reducing the duration of the at least one timer, and thereby the window during which the at least one timer is to run, based on the proximity of the window to the next active time.

19. The method of claim 18, wherein the duration of the at least one timer is reduced to a shorter duration, and the method further comprises:

starting the at least one timer to run for the shorter duration during which the user equipment monitors the downlink channel for the particular downlink transmission; and monitoring the downlink channel for the particular downlink transmission further during the next active time.

20. The method of claim 18, wherein the duration of the at least one timer is reduced to eliminate the at least one timer, and the method further comprises:

monitoring the downlink channel for the particular downlink transmission only during the next active time.

21. The method of claim 18, wherein the at least one timer includes an inactivity timer that indicates a duration after a downlink transmission that indicates a new downlink transmission or a new uplink transmission, and wherein the duration of the inactivity timer is reduced such that the user equipment monitors the downlink channel for the new downlink transmission or a grant for the new uplink transmission at least during the next active time.

22. The method of claim 18, wherein the at least one timer includes a downlink retransmission timer that indicates a maximum duration that the user equipment monitors the downlink channel while expecting a downlink retransmission, or an uplink retransmission timer that indicates a maximum duration that the user equipment monitors the downlink channel while expecting a grant for an uplink retransmission, and wherein the duration of the downlink retransmission timer is reduced such that the user equipment monitors the downlink channel for the downlink retransmission or the grant for the uplink retransmission at least during the next active time.

* * * * *